(12) United States Patent
Klochkoff et al.

(10) Patent No.: US 8,696,915 B2
(45) Date of Patent: *Apr. 15, 2014

(54) WATER TREATMENT APPARATUS AND PROCESS TO REDUCE PIPE SCALE AND BIOMASS USING POSITIVE PRESSURE ULTRAVIOLET OXYGENATION

(75) Inventors: Eugene Klochkoff, Hicksville, NY (US); Clive Ling, Hewlett, NY (US); Steven Lerman, Plainview, NY (US)

(73) Assignee: Cascade Water Services, Hicksville, NY (US)

( * ) Notice: Subject to any disclaimer, the term of this patent is extended or adjusted under 35 U.S.C. 154(b) by 379 days.

This patent is subject to a terminal disclaimer.

(21) Appl. No.: 13/066,944

(22) Filed: Apr. 28, 2011

(65) Prior Publication Data

US 2012/0272676 A1    Nov. 1, 2012

(51) Int. Cl.
| | | |
|---|---|---|
| C02F 1/00 | (2006.01) |
| C02F 1/48 | (2006.01) |
| C02F 1/72 | (2006.01) |
| C02F 1/76 | (2006.01) |
| C02F 1/78 | (2006.01) |
| B03D 3/06 | (2006.01) |
| B01J 19/08 | (2006.01) |
| B01J 19/12 | (2006.01) |
| C02F 1/32 | (2006.01) |
| C02F 1/68 | (2006.01) |
| B01D 35/00 | (2006.01) |
| B01D 21/24 | (2006.01) |
| B01D 24/38 | (2006.01) |
| B01D 25/30 | (2006.01) |
| B01D 29/88 | (2006.01) |
| B01D 33/70 | (2006.01) |
| B01D 33/82 | (2006.01) |
| A61L 2/00 | (2006.01) |

(52) U.S. Cl.
USPC ............. 210/748.16; 210/748.1; 210/748.17; 210/748.19; 210/696; 210/192; 210/759; 210/760; 210/763; 210/90; 210/101; 422/24; 422/186.3

(58) Field of Classification Search
None
See application file for complete search history.

(56) References Cited

U.S. PATENT DOCUMENTS

| | | |
|---|---|---|
| 1,435,192 A | 11/1922 | Anderson |
| 2,295,046 A | 8/1940 | Noel |
| 2,443,429 A | 6/1948 | Marks et al. |
| 3,186,929 A | 6/1965 | Rippie |
| 3,336,096 A | 8/1967 | Czulak et al. |
| 3,603,827 A | 9/1971 | Degawa et al. |
| 3,659,096 A | 4/1972 | Kompanek |

(Continued)

*Primary Examiner* — Nam Nguyen
*Assistant Examiner* — Clare Perrin
(74) *Attorney, Agent, or Firm* — John F. Vodopia

(57) ABSTRACT

A method of treating water in order to minimize scaling and biomass buildup in water conduits or containers in which the treated water is used includes pressurizing and optionally filtering ambient air, processing the pressurized ambient air in a chamber including at least one ultraviolet light source operated to generate an output flow mixture of pressurized air and reactive oxygen species (ROS) gas, mixing the pressurized ROS/gas output mixture to realize a flow of water/pressurized ROS gas/air mixture and outputting the flow of water/pressurized ROS gas/air mixture as the treated water process product. The process includes generating reactive oxygen species (ROS) gas in the pressurized ROS/gas output mixture including at least one of Super Oxide ($O_2^-$), Peroxide ($—O_2—$), Hydro peroxide ($HO_2^-$), Hydroxyl Radicals (OH.), Ozone ($O_3^-$) and Molecular Oxygen ($O_2$). The ultraviolet light source, the flow rate of the pressurized air, the water, the water/pressurized ROS gas/air mixture and the output volume are controlled to optimize scaling and biomass reduction.

16 Claims, 4 Drawing Sheets

(56) References Cited

U.S. PATENT DOCUMENTS

| | | | |
|---|---|---|---|
| 3,665,235 A | 5/1972 | Hugot | |
| 4,008,136 A | 2/1977 | Williams | |
| 4,033,719 A | 7/1977 | Conn et al. | |
| 4,090,960 A | 5/1978 | Cooper | |
| 4,101,424 A | 7/1978 | Schooley et al. | |
| 4,141,830 A * | 2/1979 | Last | 210/748.12 |
| 4,179,616 A | 12/1979 | Coviello et al. | |
| 4,214,962 A | 7/1980 | Pincon | |
| 4,229,389 A | 10/1980 | Granger | |
| 4,230,571 A | 10/1980 | Dadd | |
| 4,255,257 A | 3/1981 | Greiner et al. | |
| 4,255,383 A | 3/1981 | Schenck | |
| 4,259,269 A | 3/1981 | Flowers | |
| 4,297,222 A | 10/1981 | Takeguchi et al. | |
| 4,338,199 A | 7/1982 | Modell | |
| 4,372,860 A | 2/1983 | Kaas | |
| 4,563,286 A | 1/1986 | Johnson et al. | |
| 4,655,933 A | 4/1987 | Johnson et al. | |
| 4,752,401 A | 6/1988 | Bodenstein | |
| 5,266,216 A | 11/1993 | Agueda et al. | |
| 5,424,032 A | 6/1995 | Christensen et al. | |
| 5,443,719 A | 8/1995 | Johnson et al. | |
| 5,597,479 A | 1/1997 | Johnson | |
| 5,616,250 A | 4/1997 | Johnson et al. | |
| 5,622,622 A | 4/1997 | Johnson | |
| 5,635,059 A | 6/1997 | Johnson | |
| 5,685,994 A | 11/1997 | Johnson | |
| 5,738,780 A * | 4/1998 | Markham | 210/143 |
| 6,517,713 B2 | 2/2003 | Gargas | |
| 6,740,245 B2 | 5/2004 | Johnson | |
| 6,923,901 B2 | 8/2005 | Leffler et al. | |
| 7,160,448 B2 | 1/2007 | Johnson | |
| 7,326,330 B2 * | 2/2008 | Herrington et al. | 205/769 |
| 2003/0150708 A1 * | 8/2003 | Fink | 204/157.3 |
| 2003/0173276 A1 * | 9/2003 | Arnaud | 210/143 |
| 2004/0120845 A1 * | 6/2004 | Potember et al. | 422/4 |
| 2005/0274669 A1 * | 12/2005 | Marchesseault et al. | 210/605 |

* cited by examiner

EFFUSER

WATER TREATMENT APPARATUS AND PROCESS TO REDUCE PIPE SCALE AND BIOMASS USING POSITIVE PRESSURE ULTRAVIOLET OXYGENATION

BACKGROUND OF THE INVENTION

This invention is an apparatus and process used to reduce the occurrence of scale and biomass formation in water systems or aqueous systems.

The cause of scaling within water pipes is a gradual buildup of dense and adherent calcium carbonate deposits. Calcium carbonate formation or precipitation starts with carbon dioxide in air. It is one of the most common natural gasses derived from respiration, fuel emission and photosynthesis. When it dissolves in water (rain or moisture), it forms weak carbonic acid. The Carbonic acid in the rain and ground water dissolves lime stone sedimentary rock (calcium carbonate) to form calcium bicarbonate. Calcium bicarbonate is a soluble form of calcium carbonate. Its formation occurs at a neutral pH (6 to 8). The reason that calcium carbonate is important in water treatment is that it has a very low solubility, and its solubility decreases with an increase in temperature. All water-cooled heat transfer equipment is vulnerable to calcium carbonate fouling or deposition due to lower calcium carbonate solubility on the heat transfer surface than in the cooling bulk water.

When calcium carbonate crystallizes on a heated surface, the crystals line up to form a structure similar to a brick wall, and it is dense and impervious to heat transfer. Its poor thermal conductivity impedes heat transfer, which causes a waste in energy and creates a potential danger of boiler-tube overheat and the possibility of a compressor shutdown in air-conditioning equipment. When crystals line up in an orderly manner as previously described, they form rock like, rigid, dense structures. Certain structures are denser and more adherent than others. In the case of calcium carbonate formed on heat transfer surfaces, the structure is primarily in the form of calcite with a small amount of aragonite.

There is a third uncommon type formed, vaterite, which is hexagonal in molecular structure.

SUMMARY OF THE INVENTION

The inventive process and apparatus reduce and/or overcome the problem of scaling and biomass buildup in systems including water storage and water piping apparatus, such as HVAC systems, process water and recreational water, e.g., boiler, cooling towers, decorative fountains, etc.

The inventive process and apparatus generate a mixture of "Reactive Oxygen Species" (ROS) gas mixed with water, use of which results in the reduction of the calcium carbonate via formation of less adherent calcium carbonate. The less adherent calcium carbonate is more effectively flushed out from the inside of the piping within which the water mixed with the ROS gas is piped. The crystal structure of aragonite calcium carbonate is more efficiently motivated for removal than the crystal structure of calcite calcium carbonate. The cause of biomass within piping and other water carrying systems is high bacteria growth which can be reduced by use of water mixed with the ROS gas, generated by the inventive process and apparatus as described.

Ambient air is pressurized into a chamber through a pump or fan mechanism, included in the apparatus, where it is exposed to ultraviolet radiation to generate the ROS gas as a partial product of the air. This partial product is a mixture of ROS gas with residual, non-converted air. The resultant outflow of pressurized air mixed with the ROS gas is then effused into water. The water, so conditioned, provides for a reduction of scale and biomass formation and sanitizes and improves heat transfer in downstream piping where this water flows. This reduction in scale and biomass formation minimizes service work such as cleaning and de-scaling in applications such as HVAC systems, solar systems, cooling towers, fountains and other applications, without limitation, where there is a flow of water through piping.

One embodiment provides a water treatment apparatus for generating treated water that minimizes scaling in water conduits or containers in which the treated water is used. The apparatus comprises a chamber including at least one ultraviolet light source for processing pressurized ambient air to generate an output flow mixture of pressurized air and reactive oxygen species (ROS) gas, a controller for controlling at least one ultraviolet lamp and an effuser for mixing a water flow with the pressurized ROS gas/air output flow mixture to realize a water/pressurized ROS gas/air mixture that is output as the treated water.

The water treatment apparatus includes a pump or fan for pressurizing of otherwise increasing the barometric flow pressure of ambient air supplied to the chamber and/or a filter (optional) for cleaning and conditioning the ambient air as it is supplied to the chamber. The effuser includes a water inlet, a mixing chamber, a pressurized air/ROS gas inlet, an aeration device connected to the gas inlet and a chamber outlet for the treated water which represents the final process product. The controller can include an ammeter or other apparatus to meter, monitor and/or control the pressurized ROS gas/air output flow mixture. Preferably, such an electronic controller operates as a step-up transformer that effectively controls the processing of the pressurized ambient air by the ultraviolet lamps to generate the pressurized ROS gas/air flow mixture by providing suitable voltage and current that illuminates the ultraviolet lamps.

The chamber can be configured with copper/copper alloys, or other suitable metal constructs in order to catalyze the processing of the ambient air to generate the pressurized ROS gas/air output flow mixture. Preferably, the copper/copper alloys, or other suitable metal constructs, comprise at least one support structure. The reactive oxygen species (ROS) gas include at least one of Super Oxide ($O_2^-$), Peroxide (—$O_2$—), Hydroperoxide ($HO_2^-$), Hydroxyl Radicals (OH.), Ozone ($O_3^-$) and Molecular Oxygen ($O_2$).

Another embodiment provides an HVAC system including a water supply inlet and water treatment apparatus for generating treated water that minimizes scaling in fluid communication with said water supply inlet, where the water treatment apparatus comprises a chamber including at least one ultraviolet light source for processing pressurized ambient air to generate an output flow mixture of air pressurized and reactive oxygen species (ROS) gas, a controller for controlling the at least one ultraviolet light source, an ammeter, a monitor for monitoring and/or controlling the pressurized ROS gas/air output flow mixture and an ROS gas/air ratio in the pressurized ROS gas/air output flow mixture and an effuser for mixing a water flow with the pressurized ROS gas/air output flow mixture to realize a water/pressurized ROS gas/air flow mixture that is output as the treated water. The water treatment apparatus shall include a pump or fan for pressurizing of otherwise increasing the barometric flow pressure of ambient air supplied to the chamber, a filter (optional) for cleaning and conditioning the ambient air as it is supplied to the chamber.

The HVAC system may be configured as an open cooling tower and/or closed heat transfer apparatus, as a closed heating and cooling system for use in commercial, industrial and residential buildings and dwellings or as a closed heating and cooling system for use in industrial and commercial electrical power generation, without limitation.

Another embodiment provides a method of treating water that minimizes scaling in water conduits or containers in which the treated water is used. The method includes providing pressurized ambient air into a treatment chamber, processing the pressurized ambient air in the treatment chamber through the use of at least one ultraviolet light source to generate an output flow mixture of pressurized air and reactive oxygen species (ROS) gas, controlling the at least one ultraviolet light source, a flow rate of the pressurized ROS gas/air output flow mixture and an ROS gas/air ratio in the pressurized ROS gas/air output flow mixture, mixing the pressurized ROS gas/air output flow mixture with water to realize a flow of water/pressurized ROS gas/air flow mixture and outputting the flow of water/pressurized ROS gas/air flow mixture as the treated water.

The step of controlling includes monitoring the electric current flow to the UV lamps that generate the pressurized ROS gas/air output flow mixture and controlling the electric power of the lamps when necessary to optimize ROS gas/air mixing to optimize mixture output flow volume. The step of controlling includes controlling the effective radiation provided by the UV light sources, for example, through switching, to optimize pipe scale and biomass reduction in systems treated with the water/pressurized ROS gas/air flow mixture output. The processing and controlling preferably limit ROS gas/air content and ratio in the water/pressurized ROS gas/air flow mixture output in cooperation with copper present in the chamber, which copper presence catalyzes the generation of the ROS gas within the pressurized air input, and generating reactive oxygen species (ROS) gas including at least one of Super Oxide ($O_2^-$), Peroxide (—$O_2$—), Hydro peroxide ($HO_2^-$), Hydroxyl Radicals (OH.), Ozone ($O_3^-$) and Molecular Oxygen ($O_2$).

DESCRIPTION OF THE DRAWINGS

The present invention can best be understood in connection with the accompanying drawings. It is noted that the invention is not limited to the precise embodiments shown in drawings, in which:

FIG. 4A depicts a planar view of one of disks 17, for placement near the ends 20 of chamber 18.

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The process for this generation of the water and ROS gas mixture is best illustrated by a description of an example embodiment of the apparatus necessary to conduct the process, which are shown in FIGS. 1-4A and described herein below.

Figure 1:
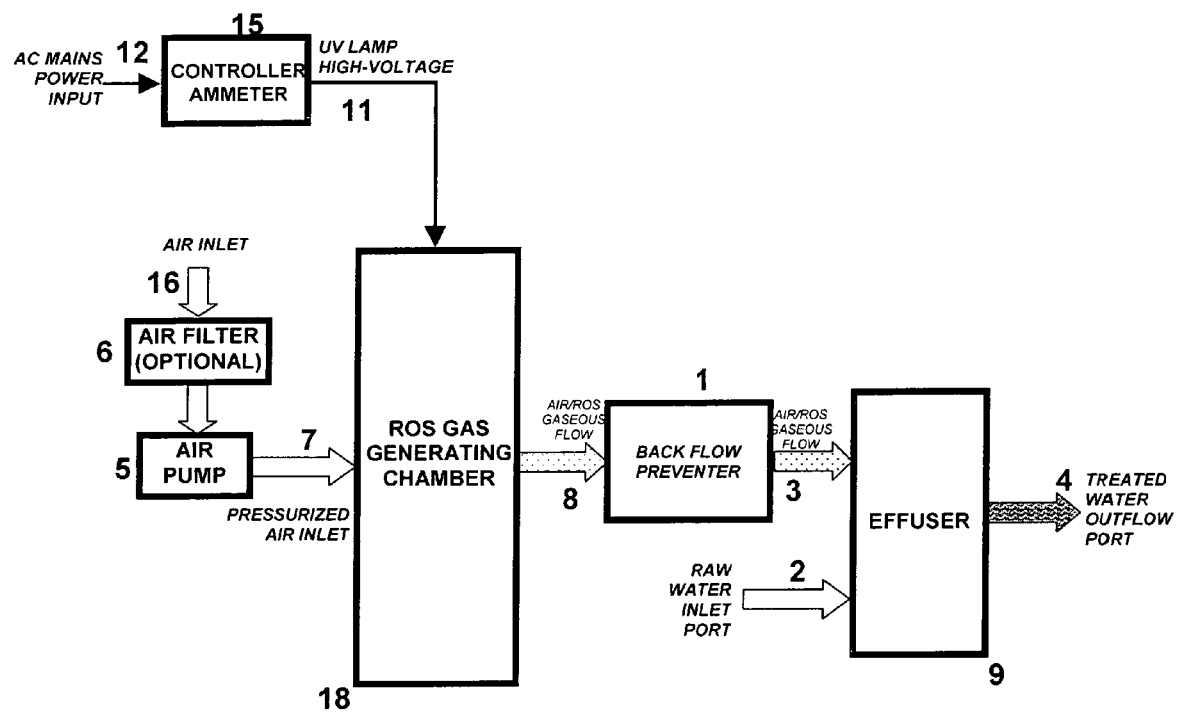
FIG. 1 is a diagram depicting one embodiment of apparatus of the invention, and process.

FIG. 1 depicts both apparatus and process flow. The apparatus can be described as divided into four major sections, a controller 15, an air pump or fan mechanism 5 with an optional particle filter 6, to pressurize air, a ROS gas generating chamber 18 for receiving the pressurized air and generating the ROS gas to form a pressurized ROS gas/air mixture and an effuser 9 for mixing the pressurized ROS gas/air mixture with the water.

Controller 15 accepts an AC mains line voltage 12 and is used to deliver required power at an elevated voltage to one or more ultraviolet (UV) 13 lamps contained within an ROS gas generating chamber 18. Each individual ballast is used to power a single ultraviolet lamp or a dual-ballast may supply two lamps. Please note that while the inventive embodiment is described in detail utilizing UV lamps 13 as the UV source for generating the ROS gas, the invention may utilize any source of available UV light for the processing, without deviating from the scope of the invention.

The effective end of life of an UV lamp is defined in this invention as that point in time at which the UV radiation is insufficient to maintain proper anti-microbial and anti-scale activities, as the invention intends. This is a predictable rating placed on an ultraviolet emitting lamp and a scheduled maintenance plan shall require lamp replacement at scheduled intervals. The effective life of the UV lamp or UV components or UV source is defined by the manufacturer, and varies from source to source.

Air for UV exposure is sucked through an air inlet 16 into an air pump or fan 5 and delivered under pressure into the ROS gas generating chamber 18. An optional air filter 6 may be included on the input side of the air pump or fan 5 to reduce particulate content. The continuous flow of pressurized ambient air into the chamber, passing the surface of the ultraviolet emitting lamps serves to cool the lamps to ensure maximum useful life. The ROS gas generating chamber 18 exposes the pressurized air using the UV lamps 13 and forms the ROS gas. After UV treatments, the pressurized UV-treated air exits the ROS gas generating chamber 18 as a pressurized ROS gas/air mixture flow 8. A backflow preventer 1 is included in order to prevent treated water from entering the generating chamber.

The maximum air flow rate is inherently fixed by the pressure boost generated by the ambient air pump or fan mechanism in conjunction with the fixed geometry of the system components and apparatus. The ammeter is used to ensure and verify proper operation. It may be used to control the output of the ROS production.

The monitored ROS gas/air mixture flow 3 is delivered to a device called an effuser 9, which is used to mix the ROS gas/air mixture with water for treatment. As shown in detail in FIG. 2, the effuser 9 included a mixing chamber and one or more aerating devices 10, through which the ROS gas/air mixture flow 3 is passed. Raw water flow is directed into the effuser 9 via a raw water input port 2, and aerated by the ROS gas/air mixture via aerating devices 10. The aeration devices force bubbles of the ROS gas/air mixture into the raw water. The water aerated with the ROS gas/air mixture emerges from an effuser 9 exhaust port 4 and is introduced into the target water circulation system. This water aerated with the ROS gas/air mixture represents the product of this process.

Figure 2:
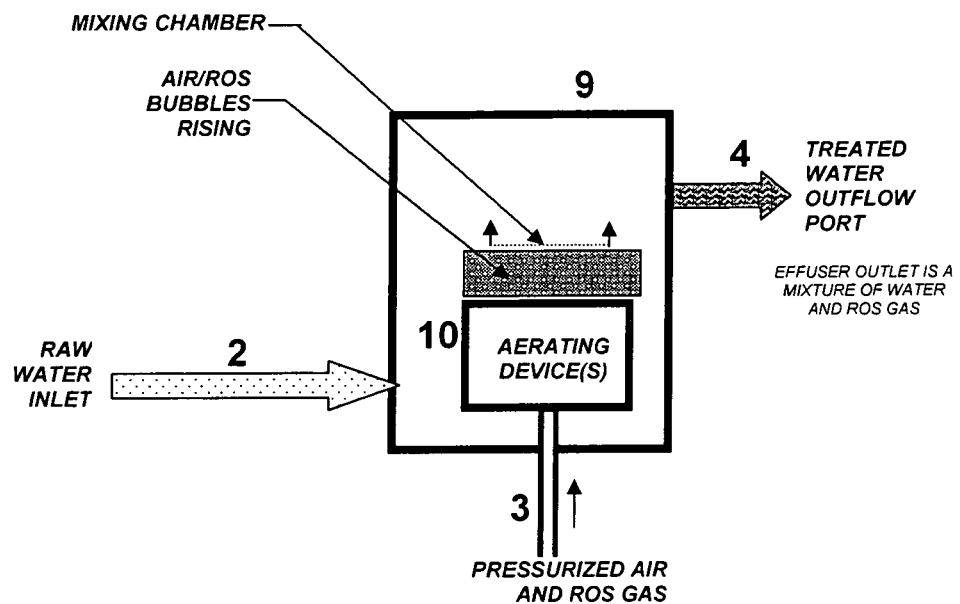
FIG. 2 is a diagram depicting the details of an effuser.

The effuser 9 is shown in greater detail in FIG. 2. Effuser 9 has multiple ports or inlets; raw water inlets 2, a conditioned water outlet port 4 and a port or inlet for receiving the pressurized ROS gas/air mixture flow 3. Raw water flows into the inlet port 2. The pressurized ROS gas/air mixture enters into the one or more aeration devices 10 and combines/mixes with the raw water inflow. After mixing aeration, the water aerated with the ROS gas/air mixture through the exhaust port outlet 4. The aeration devices may either be a natural porous stone fitted with a gas input tube or may be a sealed or unsealed vessel consisting of an air inlet and a multitude of small holes or penetrations on the outer surface to maximize the formation of tiny gas bubbles when immersed in water and pressurized with gas, i.e., the pressurized ROS gas/air mixture.

Careful selection of the aeration devices 10 within the effuser 9 as well as the effuser geometry with respect to laminar flow and turbulence controls how well the pressurized ROS gas/air and water mix. The end goal and any physical dimensions of an effuser design are to maximize the mixing action of the pressurized ROS/air gas and water. The resulting pressure of ROS gas/air and water mixture can be measured and/or observed and/or adjusted via the combination pressure adjustment/gauge or pressure monitor or pressure sensing unit installed at or near treated water outflow port 4. The ultraviolet light source, the flow rate of the pressurized air, the water, the water/pressurized ROS gas/air mixture and the output volume are controlled to optimize scaling and biomass reduction.

Figure 3:
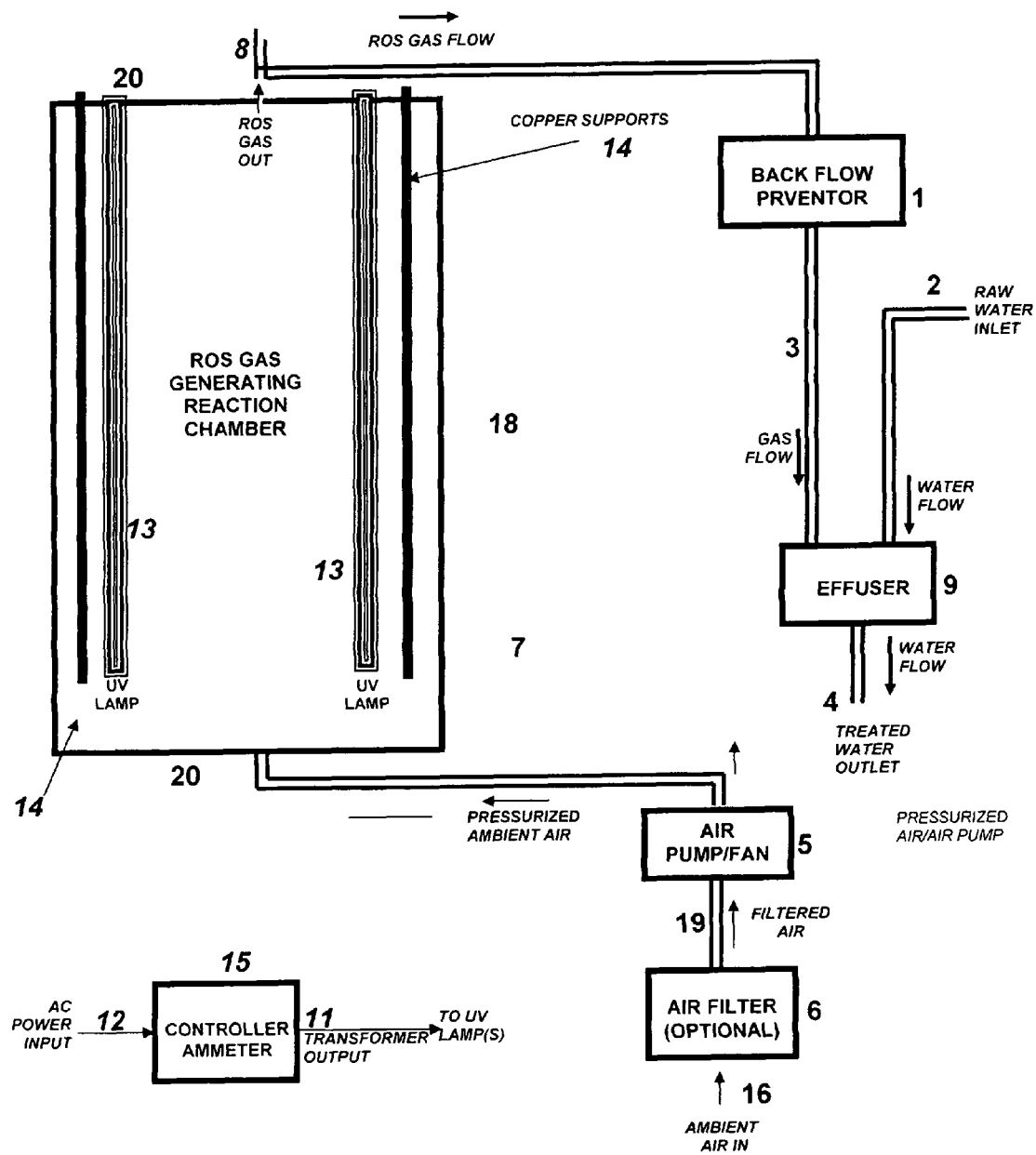
FIG. 3 is a diagram depicting the FIG. 1 embodiment in more detail.
Figure 4:
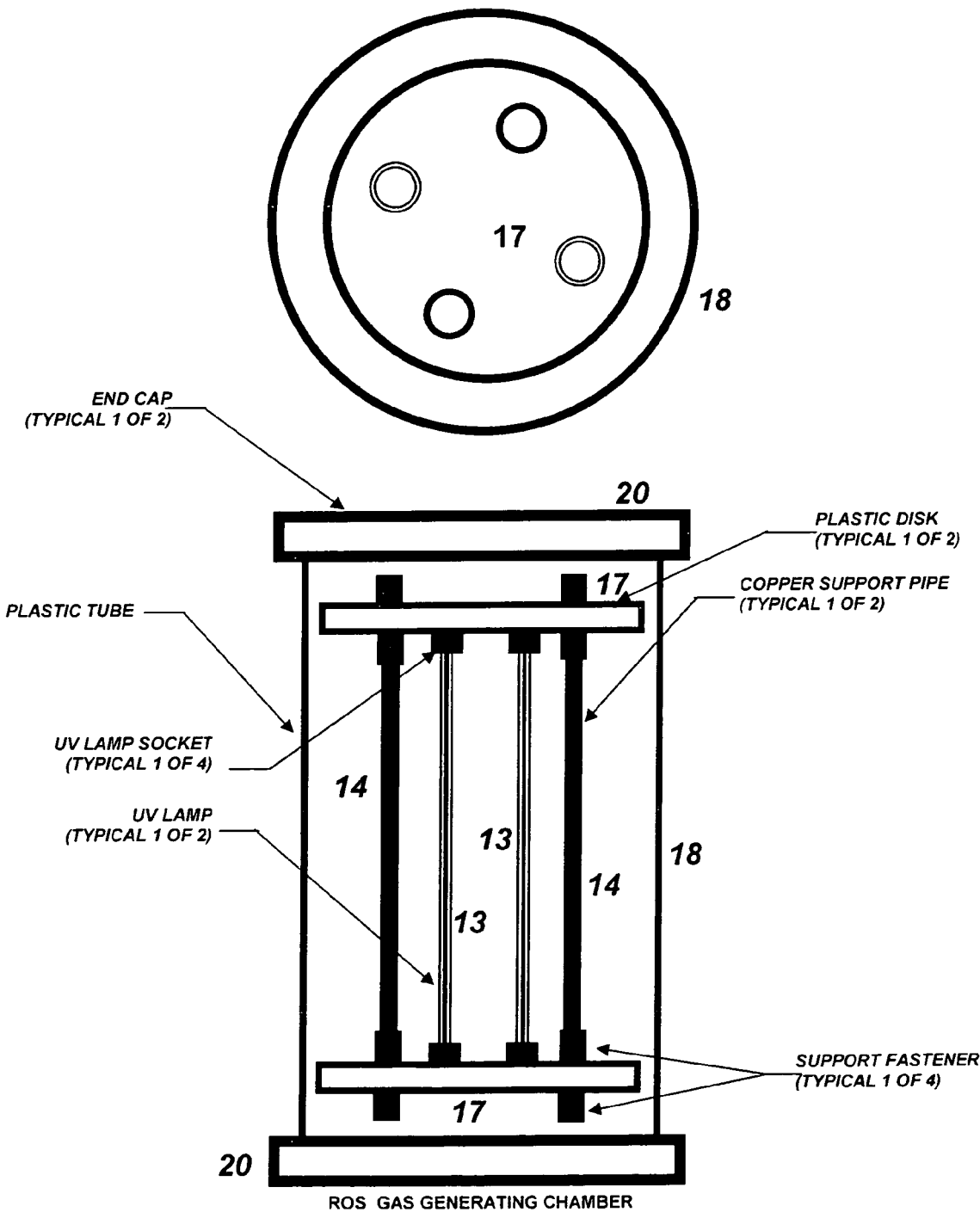
FIG. 4 is a diagram depicting the details of a chamber and UV lamp mounting structure.

The ROS gas generating chamber 18 is shown in greater detail in FIGS. 3, 4 and 4A. The ROS gas generating chamber 18 is cylindrical in structure. The ROS gas generating chamber 18 is preferably constructed of a thick plastic pipe that is capped on both ends with end caps 20. The ROS gas generating chamber 18 contains the ultraviolet lighting lamps(s) 13 that are similar in structure to a common linear fluorescent lamp, except without the white light producing coating inside the clear tube. The clear tube lamp envelope material is chosen to maximize transmission of ultraviolet light in the wavelength of primary interest. In this process, preferably a light source with a 185 nanometer wavelength (or less) is used, but the invention is not limited thereto. For that matter, while the figures show two UV lamps 13, and controller 15 is described as driving same number, the number is provided for exemplary purposes and the invention may be practiced with one or any number of UV lamps, solid state or solar light sources without deviating from the scope and spirit of the invention. When sufficient voltage is applied to the lamps, they emit a rich source of ultraviolet radiation. In addition, the lamps generate heat.

Preferably, the lamp(s) are mounted in between lamp socket(s) bolted to circular disks 17 (see FIG. 4). There is a disk 17 near the top and bottom ends 20 of the chamber (FIGS. 4 and 4A). The disks 17 are preferably made from plastic or other suitable insulating and inert material. Within the chamber 18, one or two copper/copper alloy support tubes 14 are used to separate the mounting disks which secure the ultraviolet lamp sockets to maintain a space sufficient for clearance for the ultraviolet lamps. For that matter, the process may be performed with one or more UV sources 13 depending on the volume of water flow for treatment. FIG. 4 shows the structure of the disks 17, lamp(s) 13 and copper tube(s) 14. FIG. 4A depicts one of disks 17 in detail, which disks are used for placement near either chamber end cap 20.

The presence of ultraviolet radiation in the ROS gas generating chamber 18 causes the formation (from the air) of a number of gaseous components known as "Reactive Oxygen Species" (ROS). The ROS gas components are mixed with pressurized air. The following gasses are some of the components of this ROS gas mixture: "Super Oxide ($O_2^-$)", "Peroxide (—$O_2$—)", "Hydro peroxide ($HO_2^-$)", "Hydroxyl Radicals (OH.)", "Ozone ($O_3^-$)" and "Molecular Oxygen ($O_2$)".

The addition and mixture of pressurized ROS gas/air mixture with water is the core mechanism for this inventive process. The presence of copper or other suitable metal (a metallic element above a certain atomic weight) in the form of the support rods catalyzes this reaction.

The foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention. It is further known that other modifications may be made to the present invention, without departing the scope of the invention, as noted in the appended claims.

The invention claimed is:

1. A water treatment apparatus for generating treated water that minimizes scaling in water conduits or containers in which the treated water is used, comprising:
   a chamber including at least one ultraviolet lamp for processing pressurized ambient air to generate reactive oxygen species (ROS) gas and a pressurized air/ROS gas output flow mixture;
   a controller, the controller including a pressure gauge operable to meter, monitor and adjust the pressurized air/ROS gas output flow mixture; and
   an effuser in fluid communication with the chamber for mixing a water flow with the pressurized air/ROS gas output flow mixture to realize a water and pressurized air/ROS gas mixture that is output as the treated water;
   wherein said effuser comprises a raw water inlet, a pressurized air/ROS gas output flow mixture inlet connected to the chamber, an aeration device connected to the pressurized air/ROS gas output flow mixture inlet for mixing the water flow with the pressurized air/ROS gas output flow mixture for output as the treated water through an effuser output port;
   wherein said chamber further comprises a support structure formed of copper/copper alloys to catalyze the processing of the pressurized ambient air to generate the reactive oxygen species (ROS) gas and the pressurized air/ROS gas output flow mixture; and
   wherein the controller controls the at least one ultraviolet lamp, a flow rate of the pressurized air/ROS gas output flow mixture and an ROS gas/air ratio in the pressurized air/ROS gas output flow mixture.

2. The water treatment apparatus as set forth in claim 1, further comprising a pump or fan for pressurizing ambient air supplied to the chamber as the pressurized ambient air.

3. The water treatment apparatus as set forth in claim 2, further comprising a filter for cleaning and conditioning the pressurized ambient air supplied to the chamber.

4. The water treatment apparatus as set forth in claim 1, wherein said controller operates as a step-up transformer to effectively control the processing of the pressurized ambient air by the at least one ultraviolet lamp to generate the pressurized air/ROS gas output flow mixture by providing suitable voltage and current that illuminates the at least one ultraviolet lamp.

5. The water treatment apparatus as set forth in claim 1, wherein said reactive oxygen species (ROS) gas include at least one of super oxide ($O_2^-$), peroxide (—$O_2$—), hydroperoxide ($HO_2^-$), hydroxyl radicals (OH.), ozone ($O_3^-$) and molecular oxygen ($O_2$).

6. An HVAC system including a water supply inlet and water treatment apparatus for generating treated water that minimizes scaling in fluid communication with said water supply inlet, the water treatment apparatus comprising:

a chamber including at least one ultraviolet light source for processing pressurized ambient air to generate reactive oxygen species (ROS) gas and a pressurized air/ROS gas output flow mixture;

a controller including a pressure gauge to meter, monitor and adjust the pressurized air/ROS gas output flow mixture and controlling the at least one ultraviolet light source, a flow rate of the pressurized air/ROS gas output flow mixture and an ROS gas/air ratio in the pressurized air/ROS gas output flow mixture; and an effuser for mixing a water flow with the pressurized air/ROS gas output flow mixture to realize a water and pressurized air/ROS gas flow mixture that is output as the treated water;

wherein said effuser comprises a raw water inlet, a pressurized air/ROS gas output flow mixture inlet connected to the chamber, an aeration device connected to the pressurized air/ROS gas output flow mixture inlet for mixing raw water and the pressurized air/ROS gas output flow mixture for output as the treated water via an effuser output port; and wherein said chamber further comprises a support structure formed with copper/copper alloys to catalyze the processing of the pressurized ambient air to generate the pressurized air/ROS gas output flow mixture.

7. The HVAC system as set forth in claim 6, further comprising a pump or fan for pressurizing the ambient air supplied to the chamber as the pressurized ambient air.

8. The HVAC system as set forth in claim 7, further comprising a filter for cleaning and conditioning the pressurized ambient air supplied to the chamber.

9. The HVAC system as set forth in claim 6 configured as an open cooling tower and/or closed heat transfer apparatus.

10. The HVAC system as set forth in claim 6, further comprising a closed heating and cooling system within commercial, industrial and residential buildings and dwellings and wherein the water treatment apparatus is connected to and supplies the treated water to the closed heating and cooling system.

11. The HVAC system as set forth in claim 10, wherein the closed heating and cooling system is part of an industrial or a commercial electrical power generator.

12. A method of treating water that minimizes scaling in water conduits or containers in which treated water is used, comprising:

providing pressurized ambient air into a treatment chamber;

processing the pressurized ambient air in the treatment chamber through the use of at least one ultraviolet light source to generate reactive oxygen species (ROS) gas and a pressurized air/ROS gas output flow mixture, said treatment chamber comprises a support structure formed with copper/copper alloys to catalyze the processing of the pressurized air to generate the reactive oxygen species (ROS) gas and pressurized air/ROS gas output flow mixture;

controlling the at least one ultraviolet light source, a flow rate of the pressurized air/ROS gas output flow mixture and an ROS gas/air ratio in the pressurized air/ROS gas output flow mixture, said controlling implemented by a controller comprising a pressure gauge operable to meter, monitor and adjust the pressurized air/ROS gas output flow mixture;

mixing the pressurized air/ROS gas output flow mixture with raw water to realize a flow of water and pressurized air/ROS gas output flow mixture by use of an effuser embodying a raw water inlet, an inlet for receiving the pressurized air/ROS gas output flow mixture, an aeration device connected to the pressurized ROS air/ROS gas output flow mixture inlet and a treated water output port; and outputting the flow of water and pressurized air/ROS gas output flow mixture as the treated water.

13. The method as set forth in claim 12, wherein the step of controlling includes monitoring the pressure of the pressurized air/ROS gas output flow mixture and adjusting a pressure of the pressurized air/ROS gas output flow mixture gas and air mixing, and where necessary to optimize ROS gas and air mixing, and monitoring a flow rate of the pressurized air/ROS gas output flow mixture and adjusting a pressurized air volume with respect to a raw water flow volume where necessary to optimize a water and pressurized air/ROS gas output flow volume.

14. The method as set forth in claim 12, wherein the step of controlling includes controlling an effective radiation provided by the at least one ultraviolet light source to optimize pipe scale and biomass reduction in systems treated with the water and pressurized air/ROS gas output flow mixture.

15. The method as set forth in claim 12, wherein the steps of processing and controlling limit an ROS gas/air content and ratio in the water and pressurized air/ROS output flow mixture in cooperation with copper present in the chamber, which copper presence catalyzes the generation of the ROS gas within the pressurized ambient air.

16. The method as set forth in claim 12, wherein the step of processing includes generating reactive oxygen species (ROS) gas including at least one of super oxide ($O_2^-$), peroxide (—$O_2$—), hydroperoxide ($HO_2^-$), hydroxyl radicals (OH.), ozone ($O_3^-$) and molecular oxygen ($O_2$).

* * * * *